(12) United States Patent
Kwack et al.

(10) Patent No.: US 9,293,111 B2
(45) Date of Patent: Mar. 22, 2016

(54) FLEXIBLE DISPLAY DEVICE INCLUDING A RECOGNITION PATTERN WITH DIFFERENT COLOR CONCENTRATION SUB-PATTERNS, AND CALIBRATION METHOD AND DISPLAY METHOD THEREOF

(71) Applicants: Jun-Ho Kwack, Yongin (KR); Young-Sik Kim, Yongin (KR)

(72) Inventors: Jun-Ho Kwack, Yongin (KR); Young-Sik Kim, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 373 days.

(21) Appl. No.: 13/826,922

(22) Filed: Mar. 14, 2013

(65) Prior Publication Data

US 2013/0314387 A1   Nov. 28, 2013

(30) Foreign Application Priority Data

May 22, 2012   (KR) .................. 10-2012-0054360

(51) Int. Cl.
  *G09G 5/00* (2006.01)
  *G06F 3/147* (2006.01)
  *G09G 5/02* (2006.01)

(52) U.S. Cl.
  CPC ............... *G09G 5/005* (2013.01); *G06F 3/147* (2013.01); *G09G 5/02* (2013.01); *G09G 2320/0693* (2013.01); *G09G 2380/02* (2013.01)

(58) Field of Classification Search
  CPC ...................................................... G09G 5/005
  See application file for complete search history.

(56) References Cited

U.S. PATENT DOCUMENTS

| 6,333,295 B1 * | 12/2001 | Saito ................ B41M 5/38207 |
| | | 156/235 |
| 2005/0176470 A1 * | 8/2005 | Yamakawa .................... 455/566 |
| 2006/0181552 A1 * | 8/2006 | Hopple ......................... 345/690 |
| 2008/0150885 A1 * | 6/2008 | Overwijk et al. ............. 345/107 |

FOREIGN PATENT DOCUMENTS

| JP | 04213558 A * | 8/1992 |
| KR | 10-2004-0049472 A | 6/2004 |
| KR | 10-2006-0070535 A | 6/2006 |

* cited by examiner

*Primary Examiner* — Aneeta Yodichkas
*Assistant Examiner* — Karin Kiyabu
(74) *Attorney, Agent, or Firm* — Lee & Morse, P.C.

(57) ABSTRACT

A display device includes a flexible display panel including a recognition pattern, the recognition pattern having a plurality of sub-patterns with different color concentrations and disposed in a first direction, a housing accommodating the flexible display panel, the flexible display panel being configured to extend out of the housing in the first direction to vary a display area, and a photosensor in the housing, the photosensor corresponding to the recognition pattern and being configured to recognize the recognition pattern and to sense the display area of the flexible display panel.

13 Claims, 9 Drawing Sheets

FIG. 2
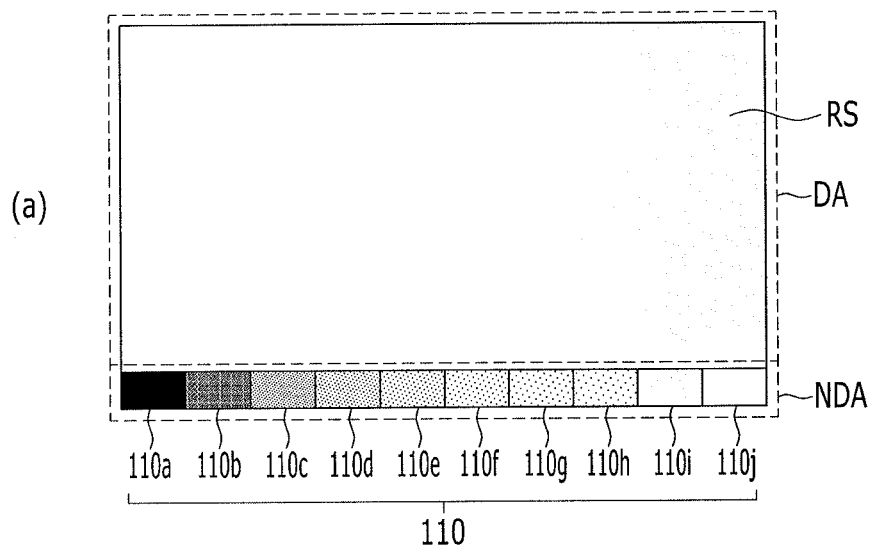
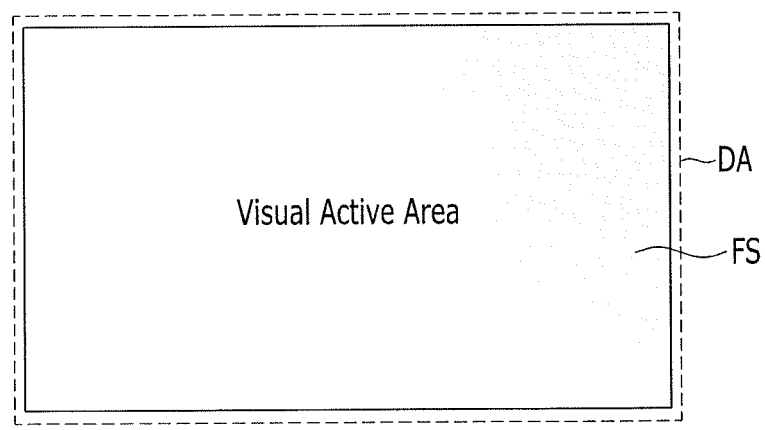

FIG. 8
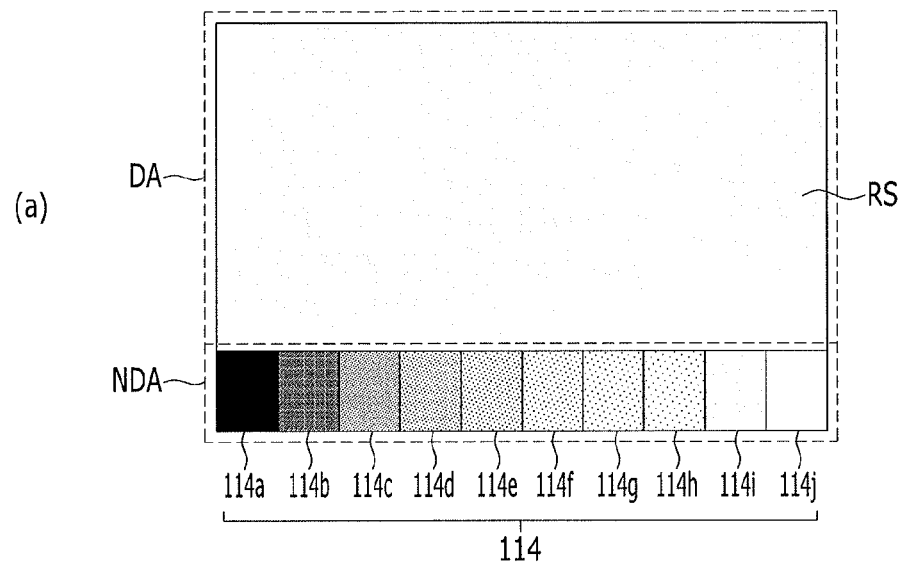
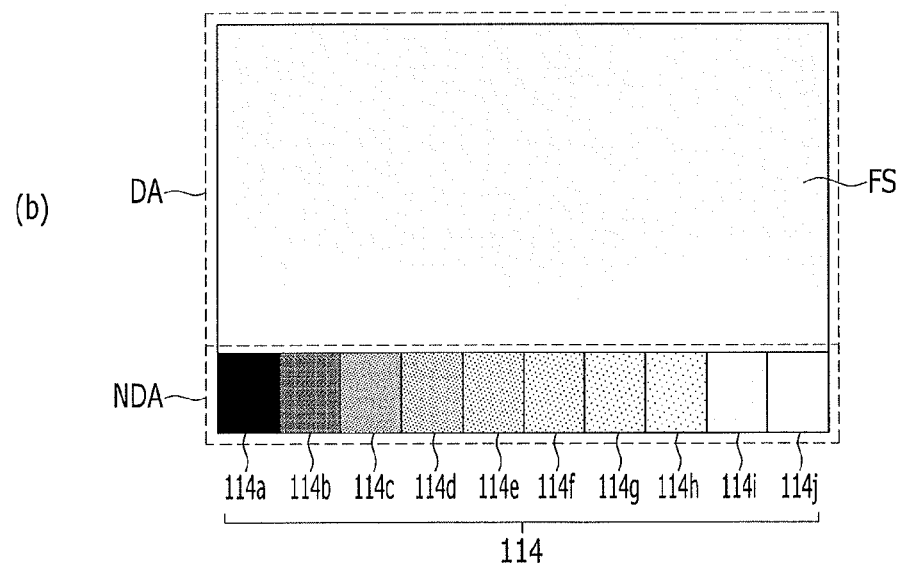

FLEXIBLE DISPLAY DEVICE INCLUDING A RECOGNITION PATTERN WITH DIFFERENT COLOR CONCENTRATION SUB-PATTERNS, AND CALIBRATION METHOD AND DISPLAY METHOD THEREOF

CROSS-REFERENCE TO RELATED APPLICATIONS

This application claims priority under 35 USC §119 to and the benefit of Korean Patent Application No. 10-2012-0054360, filed in the Korean Intellectual Property Office on May 22, 2012, the entire contents of which are incorporated herein by reference.

BACKGROUND

1. Field

The described technology relates generally to a display device, a method for calibrating the display device, and a display method of the display device. More particularly, the described technology relates generally to a display device including a flexible display panel, a method for calibrating the display device, and a display method of the display device.

2. Description of the Related Art

A display device displays images, and a flexible display device has recently been paid much attention. The conventional flexible display device represents a device including a flexible display panel for displaying images, and the flexible display panel can be folded or rolled to reduce its size and allow portability.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a display device for displaying an image optimized for a flexible characteristic of a flexible display panel, a method for calibrating the display device, and a display method of the display device.

An exemplary embodiment provides a display device including a flexible display panel including a recognition pattern, the recognition pattern having a plurality of sub-patterns with different color concentrations and disposed in a first direction, a housing accommodating the flexible display panel, the flexible display panel being configured to extend out of the housing in the first direction to vary a display area, and a photosensor in the housing, the photosensor corresponding to the recognition pattern and being configured to recognize the recognition pattern and to sense the display area of the flexible display panel.

The display device further includes a controller connected to the photosensor and the flexible display panel, and displaying an image corresponding to the display area of the flexible display panel sensed by the photosensor to the flexible display panel.

The controller includes a storage unit for storing values corresponding to respective display areas of the flexible display panel variably exposed in correspondence to the sub-patterns.

The flexible display panel further includes a display area for displaying the image and a non-display area neighboring the display area, and the recognition pattern is provided in the non-display area.

The recognition pattern is light reflective, and the photosensor includes a first light emitter and a first light receiver disposed to neighbor with each other.

The recognition pattern is light transmissive, and the photosensor includes a second light emitter and a second light receiver disposed to face each other with the recognition pattern therebetween.

The recognition pattern has an achromatic color or a chromatic color.

The sub-patterns have different chromatic colors, respectively.

The housing includes a rolled unit provided in the housing and on which the flexible display panel is wound.

The housing includes a darkroom surrounding the photosensor.

Another embodiment provides a method for calibrating a display device, including: providing the display device; recognizing a plurality of different sensor values sensed by the photosensor according to the sub-patterns; and storing a plurality of different area values corresponding to the respective display areas of the flexible display panel variable in correspondence to the different sensor values in the storage unit.

Another embodiment provides a display method of a display device, including: performing a method for calibrating the display device; allowing the photosensor to sense one of the sub-patterns to recognize the sensor value corresponding to the sub-pattern; loading the area value corresponding to the sensor value from the storage unit; and displaying an image corresponding to the display area of the flexible display panel corresponding to the area value to the flexible display panel.

BRIEF DESCRIPTION OF THE DRAWINGS

FIG. 2 shows a flexible display panel of the display device in FIG. 1.

FIG. 8 shows a flexible display panel of the display device in FIG. 7.

DETAILED DESCRIPTION

Figure 1:
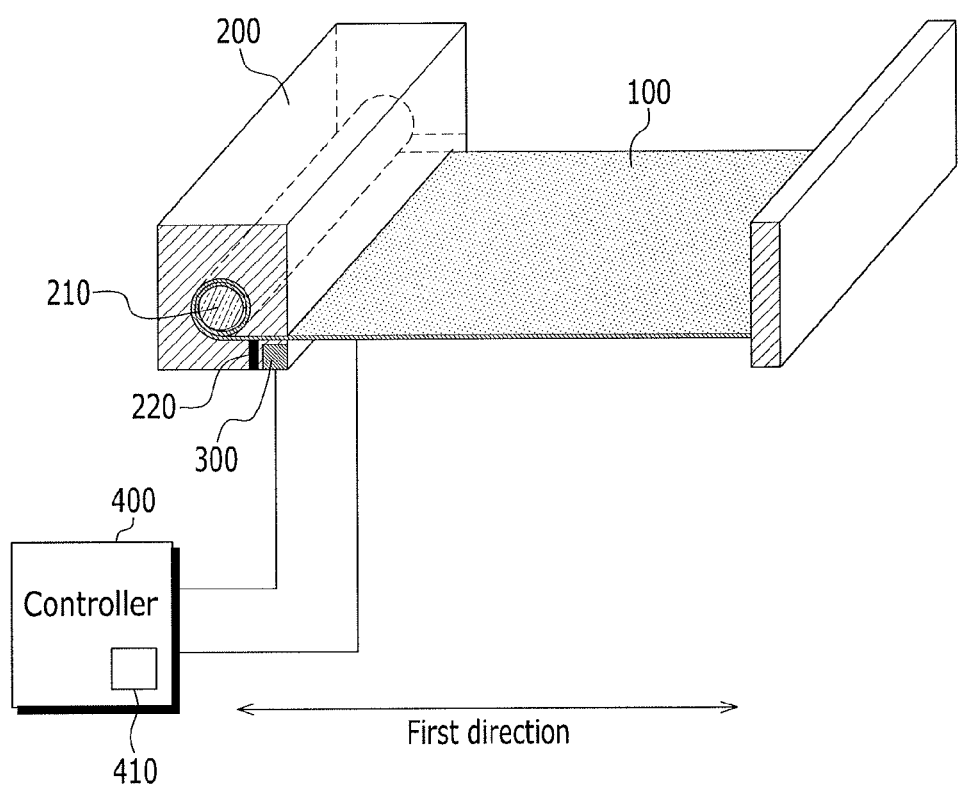
FIG. 1 shows a display device according to a first exemplary embodiment.

Example embodiments will be described more fully hereinafter with reference to the accompanying drawings. As those skilled in the art would realize, the described embodiments may be modified in various different ways, all without departing from the spirit or scope of the inventive scope.

Accordingly, the drawings and description are to be regarded as illustrative in nature and not restrictive. Like reference numerals designate like elements throughout the specification.

In addition, the size and thickness of each component shown in the drawings may be arbitrarily shown for understanding and ease of description, but example embodiments are not limited thereto. For example, in the drawings, the thickness of layers, films, panels, regions, etc., may be exaggerated for clarity.

It will be understood that when an element is referred to as being "on" another element, it can be directly on the other element or intervening elements may also be present. Further, throughout the specification, "on" implies being positioned above or below a target element and does not imply being necessarily positioned on the top in accordance with a gravity direction. In addition, unless explicitly described to the contrary, the word "comprise" and variations such as "comprises" or "comprising" will be understood to imply the inclusion of stated elements but not the exclusion of any other elements.

A display device according to a first exemplary embodiment will now be described with reference to FIGS. 1-4.

FIG. 1 shows a display device according to a first exemplary embodiment. As shown in FIG. 1, the display device includes a flexible display panel 100, a housing 200, a photosensor 300, and a controller 400.

The flexible display panel 100 displays an image processed by the display device. For example, when the display device is a mobile terminal, e.g., a cellular phone, the flexible display panel 100 may display an image related to the mobile terminal, e.g., a user interface (UI) or a graphics user interface (GUI) related to a call.

The flexible display panel 100 may include a flexible substrate or film with liquid crystal or an organic light emitting diode. The flexible display panel 100 may be formed to be transparent or light-transmissive, so that the outside may be viewed through the flexible display panel 100. A touch sensor having a shape of a touch film, a touch sheet, or a touch pad, and sensing a touch operation, is provided on a front surface of the flexible display panel 100. The flexible display panel 100 is connected to the controller 400, and displays an image according to a signal transmitted by the controller 400. The flexible display panel 100 exhibits flexible characteristics and is provided in the housing 200. For example, the flexible display panel 100 may extend out of the housing in a first direction to variably expose a display area to the outside.

FIG. 2 shows the flexible display panel 100 according to the first exemplary embodiment. In detail, FIG. 2(a) shows a rear surface (RS) of the flexible display panel 100 facing the photosensor 300, and FIG. 2(b) shows a front surface of the flexible display panel 100.

As shown in FIG. 2, the flexible display panel 100 includes a display area (DA) for displaying an image, a non-display area (NDA) neighboring the display area (DA), and a recognition pattern 110 provided in the non-display area (NDA). The display device includes the display area (DA) and the non-display area (NDA) on the rear surface (RS) of the flexible display panel 100, but example embodiments are not restricted thereto, e.g., the display area (DA) may be provided on the rear surface (RS) of the flexible display panel 100 and the non-display area (NDA) may be provided on the front surface (FS) of the flexible display panel 100. For example, when an image is displayed on the rear surface (RS) of the flexible display panel 100, the recognition pattern 110 can be provided on either one of the front surface (FS) and the rear surface (RS) of the flexible display panel 100.

Also, the recognition pattern 110 of the display device according to the first exemplary embodiment is provided in the non-display area (NDA), and the recognition pattern 110 of the display device according to another exemplary embodiment can be provided in the display area (DA) in which the image is displayed.

The recognition pattern 110 can be provided on one of the front surface or the rear surface of the flexible display panel 100 or between substrates of the flexible display panel 100, and it can be formed when a wire or a touch sensor configuring the flexible display panel 100 is formed or it can be additionally formed on the surface of the flexible display panel 100. The recognition pattern 110 is disposed in the first direction in which the flexible display panel 100 is provided into the housing 200. The recognition pattern 110 is opto-reflective, and it includes a plurality of sub-patterns (110a-110j) that are disposed in the first direction. The sub-patterns (110a-110j) have different color concentrations in the first direction. In detail, the sub-patterns (110a-110j) have an achromatic color or a chromatic color.

For example, when the sub-patterns (110a-110j) have an achromatic color, each of the sub-patterns (110a-110j) may have different color concentrations, so the color concentration gradually increases from a first sub-pattern 110a at a first end to a last sub-pattern 110j at a second end to have colors from black to white or from white to black. In another example, when the sub-patterns (110a-110j) have a chromatic color, e.g., red, green, yellow, or blue, the sub-patterns (110a-110j) gradually have different color concentrations from the first sub-pattern 110a at the first end to the last sub-pattern 110j at the second end to have colors from the dark chromatic color to the light chromatic color or from the light chromatic color to the dark chromatic color.

Referring back to FIG. 1, the housing 200 supports a first end of the flexible display panel 10 and receives the flexible display panel 100 thereinside, so that the display area of the flexible display panel 100 may be variably exposed, i.e., a size of the display area may be changed, e.g., varied, in accordance with a length of the flexible display panel 100 pulled out of the housing 200. That is, the housing 200 includes a rolled unit 210 on which the flexible display panel 100 is wound. The rolled unit 210 is provided inside the housing 200 and supports the first end of the flexible display panel 100. The rolled unit 210 winds the flexible display panel 100 so that the flexible display panel 100 may be provided in a first direction with respect to the housing 200. The rolled unit 210 is rotatable, e.g., passively or actively, and when the rolled unit 210 is rotated, the flexible display panel 100 may be pulled out to unwind and extend in the first direction with respect to the housing 200.

In addition, the housing 200 includes a darkroom 220 surrounding the photosensor 300. That is, the photosensor 300 is provided inside the darkroom 220, so unexpected external light is not irradiated onto the photosensor 300. Accordingly, a sensing error by the photosensor 300, e.g., potentially caused by external light, may be prevented or substantially minimized, thereby improving sensing reliability of the photosensor 300.

Figure 3:
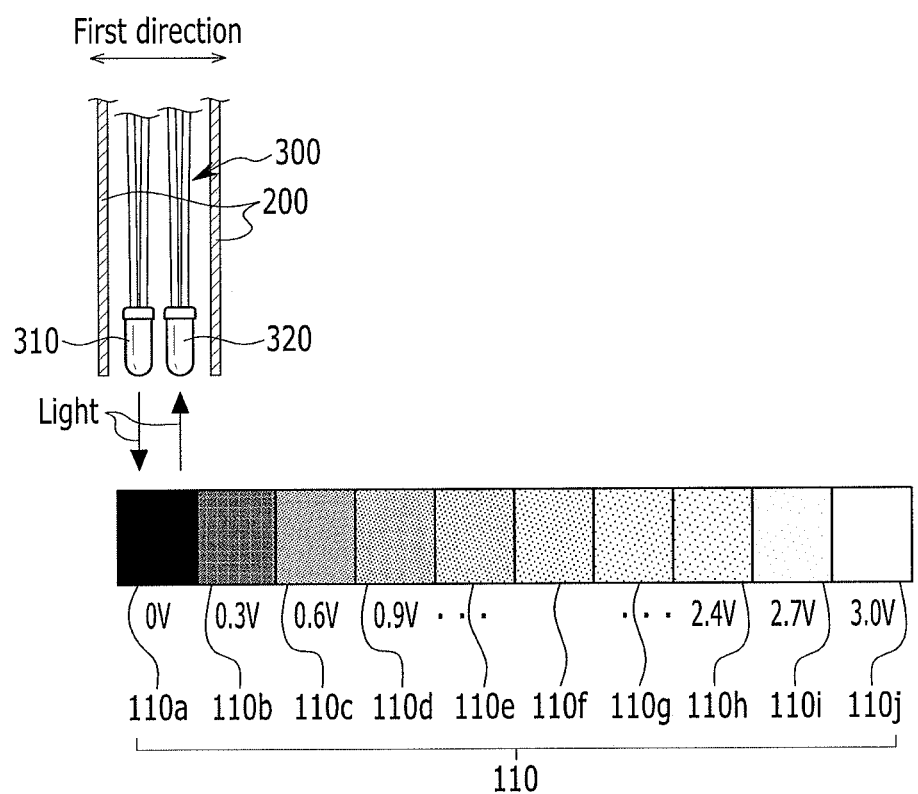
FIG. 3 shows a method for sensing a display area according to a first exemplary embodiment.

FIG. 3 shows a method for sensing a display device according to a first exemplary embodiment.

As shown in FIG. 3, the photosensor 300 is provided in correspondence to the recognition pattern 110 in the non-display area (NDA) of the flexible display panel 100. For example, the photosensor 300 may be positioned to overlap the recognition pattern 110. The photosensor 300 recognizes the recognition pattern 110 to sense the display area of the flexible display panel 100 exposed to the outside of the housing 200.

As shown in FIG. 3, the photosensor 300 includes a first light emitter 310 and a first light receiver 320 that are adjacent each other. The first light emitter 310 emits light in a direction of the recognition pattern 110, and the first light receiver 320 receives the light emitted by the first light emitter 310 and reflected by the recognition pattern 110.

The photosensor 300 uses the first light emitter 310 and the first light receiver 320 to sense the recognition pattern 110, thereby sensing the display area (DA) of the flexible display panel 100 exposed to the outside of the housing 200. In detail, when the flexible display panel 100 extends out of the housing 200 in the first direction, light emitted by the first light emitter 310 toward the extended flexible display panel 100, i.e., toward the recognition pattern 110, is incident on and reflected by the recognition pattern 110 to be received by the first light receiver 320. Therefore, the first light receiver 320 detects intensity of the received light. The light received by the first light receiver 320 is converted into a corresponding voltage value in a circuital manner, and the voltage value is changed into a digital value to be recognized.

For example, if the sub-pattern 110a at the first end from among the sub-patterns (110a-110j) has a pure black color, the sub-pattern 110a absorbs the entire light emitted from the first light emitter 310, i.e., no light is reflected back toward the first light receiver 320. Accordingly, the first light receiver 320 receives no light, and the photosensor 300 registers voltage of 0 V in a circuital manner. In another example, if the sub-pattern 110j at the second end from among the sub-patterns (110a-110j) has a pure white color, the sub-pattern 110j reflects the entire light emitted by the first light emitter 310, i.e., the first light receiver 320 receives the entire light emitted by the first light emitter 310. Accordingly, the photosensor 300 registers maximum voltage value, e.g., 3.0 V, in a circuital manner. In yet another example, if the color concentration of the achromatic color of the sub-pattern 110d among the sub-patterns (110a-110j) is about 70%, about 30% of light is reflected toward the first light receiver 320. As the voltage range between the sub-patterns 110a and 110j is between 0 V and 3.0 V, respectively, the photosensor 300 registers voltage of about 0.9 V with respect to the sub-pattern 110d.

That is, the photosensor 300 does not recognize the recognition pattern 110 as black and white, but it recognizes different reflected amounts of light from the sub-patterns (110a-110j) that have different color concentrations and are arranged in the first direction. The photosensor 300 senses the display area of the flexible display panel 100 that is exposed when the reflected amount of light by one sub-pattern from among the sub-patterns (110a-110j) is recognized.

When an operational range of the first light receiver 320 of the photosensor 300 is from about 0 V to about 3.0 V, as described in the above example s, and there are ten sub-patterns (110a-110j), it is possible to manufacture each sub-pattern to have about 0.3 V by controlling the color concentrations of the plurality of sub-patterns (110a-110j). When the sensing performance of the first light receiver 320 is about 0.1 V and the operational range of the first light receiver 320 is about 0 V to about 3.0 V, the number of configurable sub-patterns can be set to be 30. Without being restricted to the above, the number of sub-patterns can be set to as many as needed by setting the voltage value of the recognition sensing performance of the first light receiver 320 and setting the voltage value of the operational range of the first light receiver 320.

The photosensor 300 senses the display area (DA) that is variably exposed, i.e., corresponding to the sub-patterns (110a-110j), when the flexible display panel 100 is provided in the first direction of the housing 200. A signal on the exposed display area (DA) of the flexible display panel 100 sensed by the photosensor 300 is transmitted to the controller 400.

Figure 4:
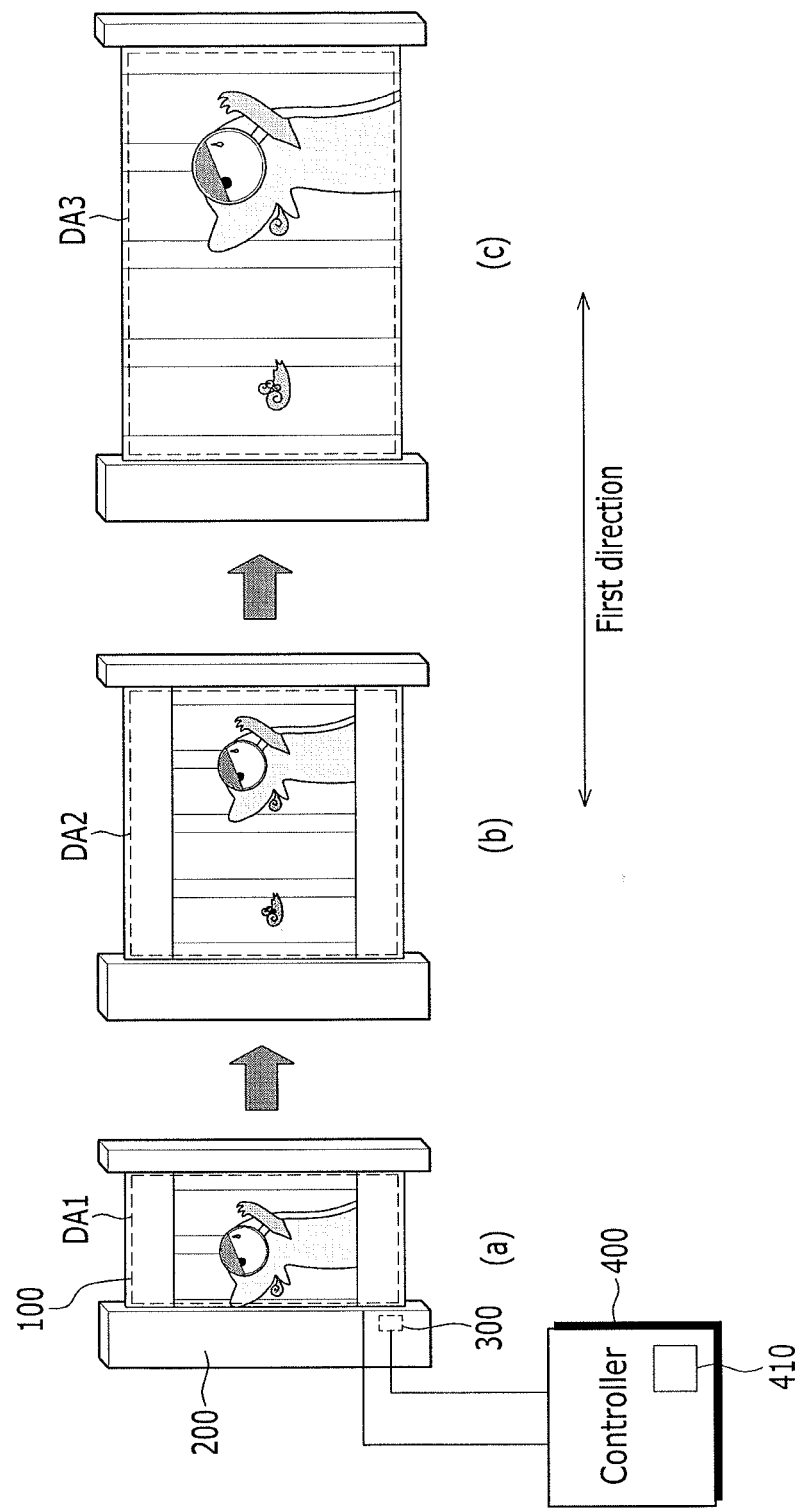
FIG. 4 shows an image displayed by a flexible display panel of a display device according to a first exemplary embodiment.

FIG. 4 shows an image displayed by the flexible display panel 100 of the display device according to the first exemplary embodiment.

As shown in FIG. 4, the controller 400 is connected to the photosensor 300 and the flexible display panel 100, and it displays the image corresponding to the exposed display area of the flexible display panel 100 sensed by the photosensor 300 to the flexible display panel 100. The controller 400 includes a storage unit 410 for storing values that correspond to the display area of the flexible display panel 100 that is variably exposed in correspondence to the sub-patterns (110a-110j). The storage unit 410 can be a volatile or non-volatile storage medium.

In detail, as shown in FIG. 4(a), when the flexible display panel 100 is provided into the housing 200 in the first direction for the first time, and a first display area DA1 is exposed, the photosensor 300 recognizes the sub-pattern when the first display area DA1 is exposed from among the sub-patterns (110a-110j), it senses the first display area DA1 and transmits a signal on the first display area DA1 to the controller 400, and the controller 400 receives the signal and displays an image of a first size corresponding to the first display area DA1 of the flexible display panel 100. In this instance, the controller 400 stores a value that corresponds to the first display area DA1 of the flexible display panel 100 that is exposed corresponding to the sub-pattern when the first display area DA1 is exposed in the storage unit 410, or it loads a value that is stored in the storage unit 410.

Further, as shown in FIG. 4(b), when the flexible display panel 100 is provided in the housing 200 in the first direction for a second time and a second display area DA2 that is greater than the first display area DA1 is exposed, the photosensor 300 recognizes the sub-pattern from among the sub-patterns (110a-110j) when the second display area DA2 is exposed, it senses the second display area DA2 to transmit a signal on the second display area DA2 to the controller 400, and the controller 400 receives the signal and displays an image of a second size corresponding to the second display area DA2 of the flexible display panel 100. In this instance, the controller 400 stores the value that corresponds to the second display area DA2 of the flexible display panel 100 exposed corresponding to the sub-pattern when the second display area DA2 is exposed in the storage unit 410 or it loads the value stored in the storage unit 410.

Also, as shown in FIG. 4(c), when the flexible display panel 100 is provided in the housing 200 in the first direction for a third time and a third display area DA3 that is greater than the second display area DA2 is exposed, the photosensor 300 recognizes the sub-pattern when the third display area DA3 is exposed from among the sub-patterns (110a-110j), it senses the third display area DA3 to transmit a signal on the third display area DA3 to the controller 400, and the controller 400 receives the signal and displays an image of a third size that corresponds to the third display area DA3 of the flexible display panel 100. In this instance, the controller 400 stores the value that corresponds to the third display area DA3 of the flexible display panel 100 exposed corresponding to the sub-pattern when the third display area DA3 is exposed in the storage unit 410 or it loads the value stored in the storage unit 410.

Particularly, when the flexible display panel 100 is provided in the housing 200 in the first direction, the photosensor 300 does not recognize an order of the sub-patterns (110a-110j) formed on the flexible display panel 100, but rather senses the exposed display area of the flexible display panel 100 corresponding to the sensed sub-patterns (110a-110j) on the exposed display area. For example, if the sub-patterns (110a-110j) extend in the first direction along an entire length of the display areas DA in the first direction, the photosensor 300 may sense the sub-patterns on an exposed display area, e.g., the photosensor 300 may detect the specific sub-pattern directly below in order to determine the sub-patterns on the exposed display area extending sequentially from the detected specific sub-pattern along the first direction, to determine a size of a desired image to be displayed. Therefore, when power is supplied to the display device under any condition, the display device recognizes the sub-patterns that correspond to the currently exposed display area without monitoring the process for providing the flexible display panel 100 in the housing 200 and displays the image of a size that corresponds to the exposed display area.

As described, the photosensor 300 recognizes the recognition pattern 110 formed on the flexible display panel 100 in order to sense a size of a display area of the flexible display panel 100 that is exposed to the outside, i.e., pulled out of the housing 200. Once the size of the exposed displayed area is determined, an image that corresponds to the determined size of the display area may be displayed on the flexible display panel 100. Therefore, the image for the display device may be optimized for the flexible characteristic of the flexible display panel 100.

Particularly, the display device according to the first exemplary embodiment uses the photosensor 300 in the housing 200 to recognize the recognition pattern 110 formed on the flexible display panel 100 and to sense the display area of the externally exposed flexible display panel 100 provided in the housing 200. Therefore, when the exposed surface of the flexible display panel 100 is drawn from the housing 200 and is then bent nonlinearly, the photosensor 300 can accurately sense the display area of the flexible display panel 100 that is output from the housing 200 and is exposed to the outside.

That is, the display device according to the first exemplary embodiment does not sense the entire area of the flexible display panel 100 when it is discharged from the housing 200. The photosensor 300 recognizes in real-time the recognition pattern 110 of the flexible display panel 100 and senses the display area of the flexible display panel 100. Therefore, when the exposed surface of the flexible display panel 100 is nonlinearly bent, it can display the image of a size corresponding to the exposed display area by sensing the display area of the externally exposed flexible display panel 100.

Further, the display device according to the first exemplary embodiment does not count revolutions of the rolled unit 210 to indirectly sense the display area of the flexible display panel 100 and does not use a distance measuring means, e.g., infrared rays or ultrasonic waves, to sense the display area of the unfolded flexible display panel 100. Instead, the display device recognizes in real-time the recognition pattern 110 exposed on the exposed display area of the flexible display panel 100, so an image with an accurate size corresponds to the variable display area of the flexible display panel 100 may be variably displayed on the flexible display panel 100, which functions as a factor for improving the user's satisfaction with the display device.

Also, when the flexible display panel 100 is provided in the housing 200 in the first direction, the photosensor 300 does not recognize the order of all the sub-patterns (110a-110j) formed on the flexible display panel 100, but the photosensor 300 senses the display areas of the flexible display panel 100 corresponding to the exposed sub-patterns (110a-110j) to directly sense the exposed display area of the flexible display panel 100. Therefore, when power is supplied to the display device under any conditions, the display device recognizes the sub-pattern corresponding to the currently exposed display area without monitoring the process for providing the flexible display panel 100 in the housing 200 and displays the image of the size corresponding to the exposed display area. That is, regarding the display device according to the first exemplary embodiment, the photosensor 300 independently identifies and recognizes the sub-pattern (110a-110j) with different color concentrations and displays the image of the size corresponding to the exposed display area without an additional configuration when the power is suddenly turned off or when the flexible display panel 100 is unfolded and a part of it is folded.

A method for calibrating a display device according to a second exemplary embodiment will now be described with reference to FIG. 5. The method for calibrating a display device according to the second exemplary embodiment will be performed by using the display device according to the first exemplary embodiment.

Figure 5:
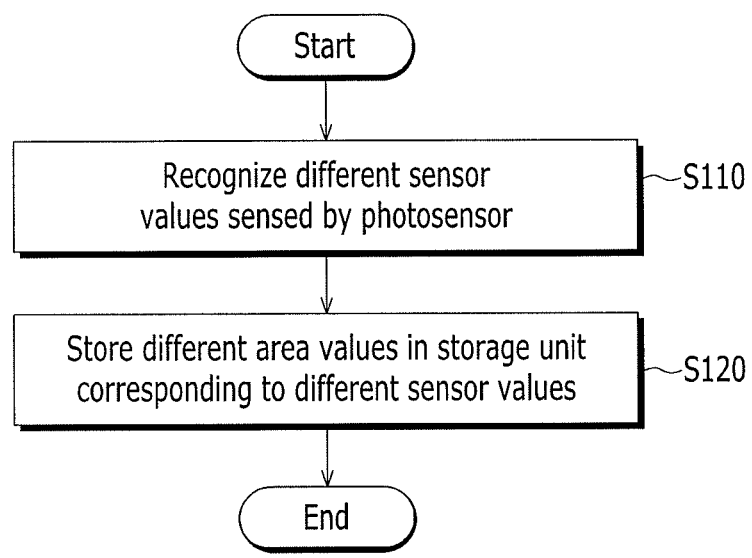
FIG. 5 shows a flowchart for calibrating a display device according to a second exemplary embodiment.

FIG. 5 shows a flowchart for calibrating a display device according to a second exemplary embodiment.

As shown in FIG. 5, a plurality of different sensor values sensed by the photosensor 300 are sensed (S110). In detail, when the flexible display panel 100 is provided in the housing 200 in the first direction, an amount of light (i.e., a voltage value) sensed by the photosensor 300 according to the sub-patterns (110a-110j) is extracted to sense different sensor values.

A plurality of different area values are stored in the storage unit 410 corresponding to the different sensor values (S120). In detail, the different sensor values corresponding to the sub-patterns (110a-110j) are matched with different area values corresponding to the display areas of the variably exposed flexible display panel 100, and the area values are stored in the storage unit 410. For example, when the number of the sub-patterns (110a-110j) is ten, the size of the different display areas of the flexible display panel 100 is ten.

That is, the first sub-pattern is recognized to match the sensor value and the first area value that corresponds to a predetermined display area, and so forth, until the sensor value having recognized the tenth sub-pattern is matched with the ten sub-patterns and the area value, i.e., corresponding to the ten area values corresponding to the ten display areas corresponding to ten sub-patterns are stored in the storage unit 410. When the rolled unit 210 of the housing 200 is driven by a motor, the above-noted calibration method can be automatically performed by rotation of the rolled unit 210 caused by rotation of the motor.

A display method of a display device according to a third exemplary embodiment will now be described with reference to FIG. 6. The display method of a display device according to the third exemplary embodiment can be performed by using the display device according to the first exemplary embodiment.

Figure 6:
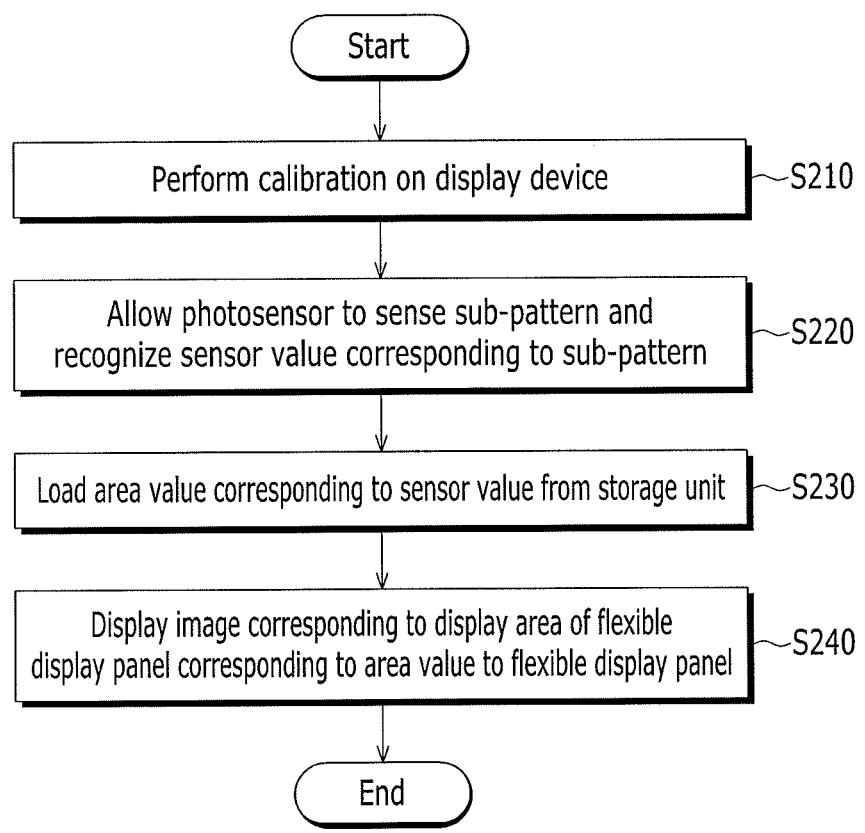
FIG. 6 shows a flowchart for a display method of a display device according to a third exemplary embodiment.

FIG. 6 shows a flowchart for a display method of a display device according to the third exemplary embodiment.

As shown in FIG. 6, a method for calibrating the display device according to the second exemplary embodiment is performed (S210).

The photosensor 300 senses one of the sub-patterns (110a-110j) to recognize the sensor value corresponding to the sub-pattern (S220).

The area value corresponding to the sensor value is loaded from the storage unit 410 (S230).

An image corresponding to the display area of the flexible display panel 100 corresponding to the area value from operation (S230) is displayed to the flexible display panel 100 (S240).

In detail, when the flexible display panel 100 is provided in the housing 200 in the first direction after the method for calibrating the display device is performed, the photosensor 300 senses the sub-patterns (110a-110j) to recognize the respective sensing values, and area values corresponding to the sensing values are loaded from the storage unit 410 so the image corresponding to the display area of the flexible display panel 100 corresponding to the area value is displayed to the flexible display panel 100.

A display device according to a fourth exemplary embodiment will now be described with reference to FIG. 7 and FIG. 8.

Figure 7:
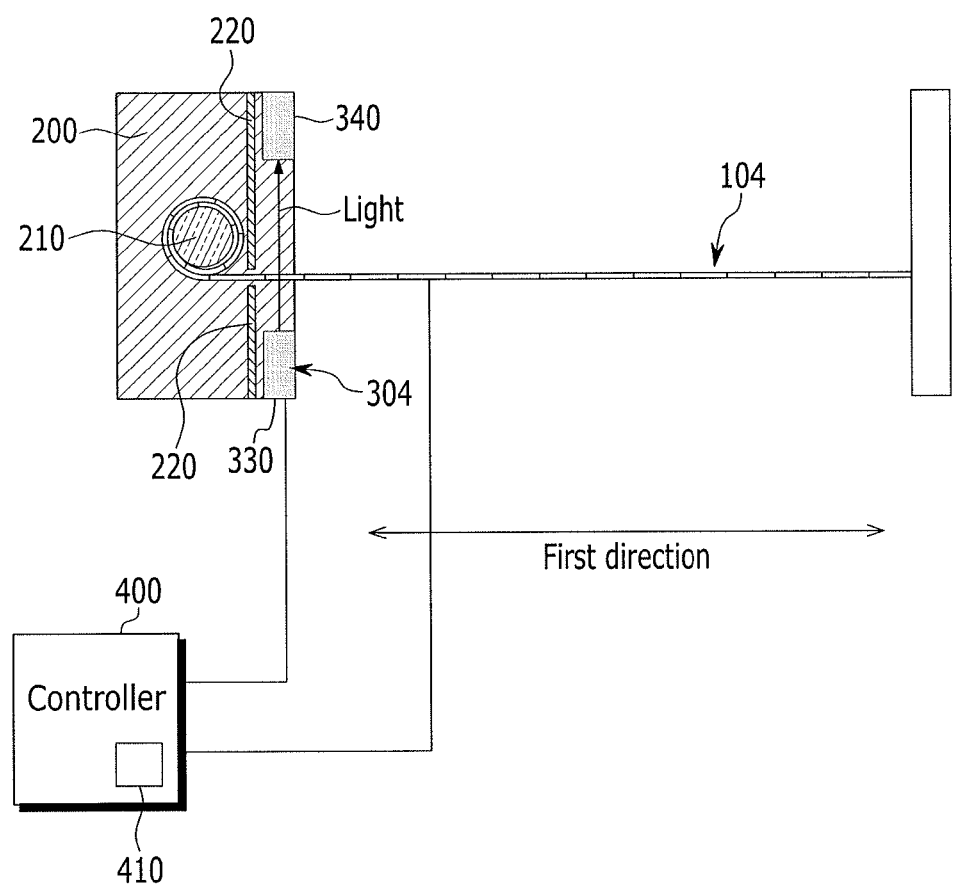
FIG. 7 shows a display device according to a fourth exemplary embodiment.

FIG. 7 shows a display device according to a fourth exemplary embodiment. FIG. 8 shows a flexible display panel of a display device according to a fourth exemplary embodiment. FIG. 8 (*a*) shows a rear surface (RS) of a flexible display panel 104 facing a photosensor 304, and FIG. 8 (*b*) shows a front surface (FS) of the flexible display panel 104.

As shown in FIG. 7 and FIG. 8, the display area (DA) and the non-display area (NDA) of a display device according to the fourth exemplary embodiment are provided on the rear surface (RS) and the front surface (FS) of the flexible display panel 104.

The recognition pattern 114 is light transmissive, and includes a plurality of sub-patterns (114a-114j) disposed in the first direction. The sub-patterns (114a-114j) have different color concentrations in the first direction. In detail, the sub-patterns (114a-114j) have an achromatic color or a chromatic color, and when the sub-patterns (114a-114j) have an achromatic color, the sub-patterns (114a-114j) from the sub-pattern 114a at a first end to the sub-pattern 114j at a second end from among the sub-patterns (114a-114j) gradually have different color concentrations and thereby have colors from black to white or from white to black.

Further, when the sub-patterns (114a-114j) have a chromatic color such as red, green, yellow, or blue, the sub-patterns (114a-114j) gradually have different color concentrations from the sub-pattern 114a at the first end to the sub-pattern 114j at the second end from among the sub-patterns (114a-114j) from among the sub-patterns (114a-114j) thereby having colors from the dark chromatic color to the bright chromatic color or from the bright chromatic color to the dark chromatic color.

A photosensor 304 is provided in the darkroom 220 of the housing 200. The photosensor 304 includes a second light emitter 330 and a second light receiver 340 that are disposed to face each other with the recognition pattern 114 therebetween. The second light emitter 330 emits light in the direction of the recognition pattern 114, and the second light receiver 340 receives the light that is emitted by the first light emitter 310 and transmitted through the recognition pattern 114.

The photosensor 304 uses the second light emitter 330 and the second light receiver 340 to recognize the recognition pattern 114, and senses the display area of the flexible display panel 104 provided in the housing 200 and exposed to the outside. In detail, when the flexible display panel 104 is provided in the housing 200 in the first direction, the light emitted by the second light emitter 330 is transmitted through the recognition pattern 114 and is received by the second light receiver 340 so the second light receiver 340 detects intensity of the received light. The light received by the second light receiver 340 is converted into a corresponding voltage value in a circuital manner, and the voltage value is changed into a digital value to be recognized.

For example, if the sub-pattern 114a at the first end from among the sub-patterns (114a-114j) has a pure black color, the sub-pattern 114a absorbs the entire light emitted from the second light emitter 330. Therefore, when the second light receiver 340 receives no light, the photosensor 304 recognizes voltage about 0 V in a circuital manner. Also, if the sub-pattern 114j at the second end from among the sub-patterns (114a-114j) is theoretically transparent, e.g., completely transparent, the transparent sub-pattern 114j at the second end transmits the entire light emitted by the second light emitter 330 to the second light receiver 340. Therefore, the photosensor 304 recognizes about 3.0 V in a circuital manner, when the sensor maximum limit value of the second light receiver 340 is 3.0 V. Therefore, when a voltage range of the recognition pattern 114 is about 0 V to about 3.0 V, the gradual increase or decrease of color concentration, e.g., achromatic color, of one sub-pattern 114d from among the sub-patterns (114a-114j) is substantially 70% and 30% of light is transmitted, the second light receiver 340 receives the 30% of the light and the photosensor 304 recognizes voltage of about 0.9 V.

As described, regarding the display device according to the fourth exemplary embodiment, the photosensor 304 recognizes the recognition pattern 114 formed on the flexible display panel 104 to sense the display area of the flexible display panel 104 provided in the housing 200 and exposed to the outside. The image corresponding to the display area is displayed to the flexible display panel 104, so the display device for displaying the image optimized for the flexible characteristic of the flexible display panel 104 is provided.

Figure 9:
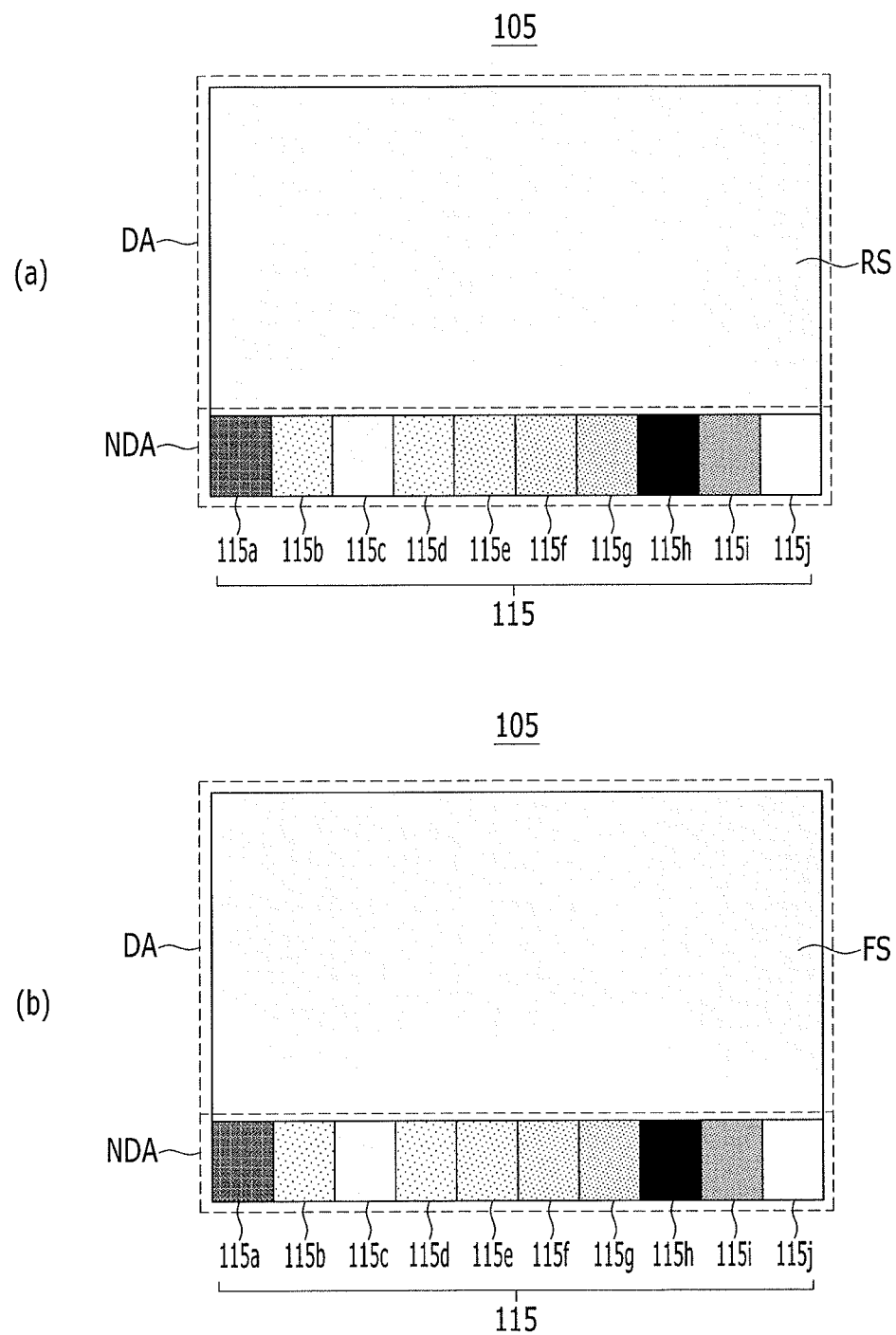
FIG. 9 shows a flexible display panel of a display device according to a fifth exemplary embodiment.

A display device according to a fifth exemplary embodiment will now be described with reference to FIG. 9. FIG. 9 shows a flexible display panel of a display device according to the fifth exemplary embodiment. FIG. 9(*a*) shows a rear surface (RS) of a flexible display panel 105 facing the photosensor 300, and FIG. 8(*b*) shows a front surface (FS) of the flexible display panel 105.

As shown in FIG. 9, a recognition pattern 115 of the display device according to the fifth exemplary embodiment is light transmissive, and includes a plurality of sub-patterns (115a-115j) disposed in the first direction. The sub-patterns (115a-115j) have different color concentrations in the first direction and different chromatic colors. In detail, the sub-patterns (115a-115j) have different chromatic colors, and the sub-patterns (115a-115j) from the sub-pattern 115a at a first end to the sub-pattern 115j at a second end from among the sub-patterns (115a-115j) have different chromatic colors with different color concentrations. For example, the sub-patterns (115a-115j) can have one of red, orange, yellow, green, blue, and violet colors, and can also have other colors.

The photosensor 300 represents a color photosensor including a third light emitter and a third light receiver facing each other with the recognition pattern 115 therebetween and recognizing a chromatic color.

The photosensor 300 uses the third light emitter and the third light receiver to recognize the recognition pattern 115 and sense the display area of the flexible display panel 105 provided in the housing 200 and exposed to the outside. In detail, when the flexible display panel 105 is provided in the housing 200 in the first direction, the light emitted by the third light emitter is transmitted through the recognition pattern 115, and the third light receiver receives the light the color of which is changed by the recognition pattern 115 and detects the color of the received light. The color of the light received by the third light receiver is changed into a corresponding voltage value in a circuital manner, it is changed into a digital value, and it is then recognized.

Accordingly, regarding the display device according to the fifth exemplary embodiment, the photosensor 300 recognizes the recognition pattern 115 formed on the flexible display panel 105 to sense the display area of the flexible display panel 105 provided in the housing 200 and exposed to the outside, and the image corresponding to the display area is displayed to the flexible display panel 104. Therefore, the display device displays am optimized image for the flexible characteristic of the flexible display panel 105.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device, comprising:
a flexible display panel including a recognition pattern, the recognition pattern having at least three of sub-patterns with color concentrations different from each other and disposed in a first direction;
a housing accommodating the flexible display panel that extends out of the housing in the first direction to vary an exposed display area of the flexible display panel; and
a photosensor in the housing, the photosensor corresponding to the recognition pattern and being configured to recognize the recognition pattern and to sense the exposed display area of the flexible display panel;
wherein the at least three of sub-patterns are sequentially arranged in the first direction, and respective color concentrations of the at least three of sub-patterns gradually increase or decrease in the first direction.

2. The display device of claim 1, further comprising a controller connected to the photosensor and to the flexible display panel, the controller being configured to provide to the flexible display panel a signal for displaying an image corresponding to the exposed display area of the flexible display panel sensed by the photosensor.

3. The display device of claim 2, wherein the controller includes a storage unit for storing values corresponding to respective exposed display areas of the flexible display panel variably exposed in correspondence to the at least three of sub-patterns.

4. A method for calibrating a display device, comprising:
providing the display device as claimed in claim 3;
recognizing a plurality of different sensor values sensed by the photosensor according to the at least three of sub-patterns; and
storing a plurality of different area values corresponding to the respective exposed display areas of the flexible display panel variable in correspondence to the different sensor values in the storage unit.

5. A display method of a display device, comprising:
performing a method for calibrating a display device as claimed in claim 4;
allowing the photosensor to sense one of the at least three of sub-patterns to recognize a sensor value corresponding to the one of the at least three of sub-patterns;
loading an area value corresponding to the sensor value from the storage unit; and
displaying an image corresponding to the exposed display area of the flexible display panel corresponding to the area value to on the exposed display area of the flexible display panel.

6. The display device of claim 2, wherein the flexible display panel further includes a display area for displaying the image and a non-display area neighboring the display area, the recognition pattern being provided in the non-display area.

7. The display device of claim 2, wherein the recognition pattern is light reflective, the photosensor including a first light emitter and a first light receiver disposed to neighbor each other.

8. The display device of claim 2, wherein the recognition pattern is light transmissive, the photosensor including a second light emitter and a second light receiver disposed to face each other with the recognition pattern therebetween.

9. The display device of claim 2, wherein the recognition pattern has an achromatic color or a chromatic color.

10. The display device of claim 2, wherein the at least three of sub-patterns have different chromatic colors, respectively.

11. The display device of claim 1, wherein the housing includes a rolled unit provided in the housing, the flexible display panel being wound on the rolled unit.

12. The display device of claim 1, wherein the housing includes a darkroom surrounding the photosensor.

13. The display device of claim 1, wherein the photosensor recognizes at least three levels of color concentrations of the at least three of sub-patterns.

* * * * *